(12) United States Patent
Winkelmann et al.

(10) Patent No.: US 8,764,301 B2
(45) Date of Patent: Jul. 1, 2014

(54) THERMALLY INSULATED ANTI-FRICTION BEARING

(75) Inventors: Ludwig Winkelmann, Erlangen (DE); Gudrun Martin, Euerbach (DE); Juergen Windrich, Leimen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 77 days.

(21) Appl. No.: 13/512,736

(22) PCT Filed: Oct. 27, 2010

(86) PCT No.: PCT/EP2010/066215
§ 371 (c)(1),
(2), (4) Date: Jun. 19, 2012

(87) PCT Pub. No.: WO2011/064061
PCT Pub. Date: Jun. 3, 2011

(65) Prior Publication Data
US 2012/0243816 A1 Sep. 27, 2012

(30) Foreign Application Priority Data

Nov. 30, 2009 (DE) .......................... 10 2009 056 349

(51) Int. Cl.
| F16C 33/62 | (2006.01) |
| F16C 33/78 | (2006.01) |
| F16C 33/58 | (2006.01) |
| F16C 19/52 | (2006.01) |
| F16C 33/66 | (2006.01) |

(52) U.S. Cl.
CPC ........... *F16C 33/7886* (2013.01); *F16C 33/586* (2013.01); *F16C 19/52* (2013.01); *F16C 2202/30* (2013.01); *F16C 33/6618* (2013.01); *F16C 33/62* (2013.01)
USPC .......................................................... 384/476

(58) Field of Classification Search
USPC .......................................................... 384/476
See application file for complete search history.

(56) References Cited

U.S. PATENT DOCUMENTS

| 3,672,734 | A | | 6/1972 | Bando | |
| 4,109,978 | A | | 8/1978 | Ernst et al. | |
| 5,375,933 | A | * | 12/1994 | Mizutani et al. | ............... 384/476 |
| 5,735,615 | A | * | 4/1998 | Pontzer | ........................ 384/476 |
| 5,961,222 | A | * | 10/1999 | Yabe et al. | ..................... 384/476 |
| 6,513,986 | B2 | * | 2/2003 | Ito et al. | ........................ 384/569 |
| 8,393,791 | B2 | * | 3/2013 | Thornton et al. | ............. 384/277 |
| 2003/0086630 | A1 | * | 5/2003 | Bramel et al. | ................ 384/476 |

FOREIGN PATENT DOCUMENTS

| DE | 42 14 655 A1 | 12/1992 |
| DE | 196 31 725 A1 | 3/1997 |
| DE | 10 2005 055 039 A1 | 5/2007 |
| JP | 2007 191203 A | 8/2007 |
| JP | 2007 298135 A | 11/2007 |

\* cited by examiner

*Primary Examiner* — Thomas R. Hannon
(74) *Attorney, Agent, or Firm* — Simpson & Simpson, PLLC

(57) ABSTRACT

An anti-friction bearing, which has an outer ring, an inner ring and rolling bodies that are arranged between the rings, distributed over a circumference of the rings, and roll on the rings. For an increase of thermal insulation, electrical insulation and the like, a film section, which is manufactured without the removal of material from a plastic film, is attached on an outer circumference of the outer ring over at least part of an axial width of the outer ring and at least over part of an outer circumference of the outer ring.

13 Claims, 2 Drawing Sheets

THERMALLY INSULATED ANTI-FRICTION BEARING

CROSS-REFERENCE TO RELATED APPLICATIONS

This application is a 371 of PCT/EP2010/066215 filed Oct. 27, 2010, which in turn claims the priority of DE 10 2009 056 349.0 filed Nov. 30, 2009. The priority of both applications is hereby claimed and both applications are incorporated by reference herein.

FIELD OF THE INVENTION

The invention relates to an anti-friction bearing, which has an outer ring, an inner ring and rolling bodies. The rolling bodies are arranged between the outer and inner rings, are distributed over the circumference of the outer and inner rings, and roll on the outer and inner rings.

BACKGROUND OF THE INVENTION

Anti-friction bearings of this type, for example deep-grooved ball bearings and the like, have long been known. In order to insulate these anti-friction bearings thermally with respect to the component to be supported, for example in a dual-mass flywheel of a drivetrain, insulating elements of plastics material are inserted between the outer ring and the component to be supported, DE 42 14 655 A1, for example, shows a dual-mass flywheel in which the two flywheel masses are mounted rotatably on one another by means of a thermally insulated anti-friction bearing. In this case an intermediate layer of plastics material is inserted between the outer ring and the second flywheel mass, which layer has to be expensively finished by machining in order to be adapted to the contours of the anti-friction bearing.

Furthermore, anti-friction bearings are known, which have an outer ring to which plastics material is applied by a spraying method. The plastics material is then sinter-fused on the outer ring and machined in order to produce a desired contour. DE 1.0 2005 055 039 A1 discloses an anti-friction bearing having plastics caps applied to both side faces of the outer ring and tensioned with respect to the outer ring by means of ceramic or plastics material.

SUMMARY OF THE INVENTION

It is the object of the invention to develop generic anti-friction bearings in an advantageous manner with regard to achieving a structure which is easy to handle and inexpensive, and is thermally and/or electrically insulating.

The object is achieved according to the invention by an anti-friction bearing comprising an outer ring, an inner ring and rolling bodies which are arranged between them, are distributed over the circumference and roll thereon, wherein a film section produced without removal of material from a plastics film is applied to the external circumference of the outer ring over at least a part of the axial width thereof and over at least a part of the external circumference thereof.

Plastics films having the desired dimension, for example a material thickness of less than 1 mm, preferably less than 0.75 mm, are produced on an industrial scale and can be procured at low cost in the form of prefabricated product. In this case, rings open on one side and made of flat film material can be applied to the external diameter. Alternatively, the circumferential ends of such rings can be closed, for example positively by clinching, before or after application. Furthermore, the plastics film may be used as a hose product with predefined diameter and pulled onto the external diameter. The use of strips of film cut to the predefined length of the external diameter of the outer ring and adapted to the axial width thereof or to the desired axial covering of the outer ring, has proved especially advantageous. As a result of the easily reproducible thickness of plastics films within the range of a few micrometers, sufficient dimensional accuracy of the external diameter of the outer ring after application of the film section is achieved without finishing thereof. With the use of the film sections, not only is good thermal insulation of the outer ring with respect to the component to be supported achieved, it has also been found that a high degree of protection against fretting corrosion resulting from tribological stress is obtained, especially in the case of movable bearings.

As plastics materials, polyether ketones, and preferably polyether ether ketone (PEEK), which has sufficient thermal stability in the region of 300° C., have proved especially suitable. The plastics films for the film sections may be mineral-reinforced, partially crystalline or amorphous plastics films being suitable. Further advantages of a use of PEEK are low absorption of moisture, high resistance to chemicals, and wear-resistance, especially at glass transition temperature. In addition, electrical insulation is sufficient for the applications envisaged even with small material thicknesses.

The joining of the film sections to the outer ring may be effected in a cost-effective manner adhesively by means of ordinary bonding methods, or alternatively by a material joint, for example by means of hot lamination for highly-stressed applications. Alternatively, methods using a heating element, ultrasound or laser welding may be adopted. For this purpose the surface of the outer ring may be appropriately prepared, for example activated chemically and/or by means of a plasma, and/or preheated. Furthermore, especially when bonding the film section to the outer ring, the surface of the film section may be pretreated, for example cleaned, and activated mechanically and/or chemically. Furthermore, plastics films which are prefabricated with an adhesive layer have proved advantageous for producing the film sections.

According to an advantageous exemplary embodiment, the film section is not necessarily arranged over the full width of the outer ring. Rather, especially for thermal insulation, a preferably central axial region of the external circumference of the outer ring may be covered by the film section, while the region or regions not covered axially may have an air gap or, depending on the operating medium, a liquid gap such as an oil gap. It has proved especially advantageous if the film section is fitted into a recess extending over at least a part of the circumference of the outer ring. In this case the recess may be a flat annular groove or the like, so that the film section can be fixed axially in a simple manner. In this case the depth of the recess may be greater than or equal to the thickness of the film section, so that the outer ring is centered on the component to be supported, or may be less than the thickness of the film section, so that better thermal insulation, together with electrical insulation, is achieved.

According to an advantageous exemplary embodiment, the film section may be extended radially inwards over at least one shoulder of the outer ring. In this case the plastics material for the film section may be prefabricated as an angle section, for example by means of an extrusion process, in which case said angle section may have suitable notches in the radially inwardly-oriented limb of the film section in order to facilitate the formation of an annular shape. By appropriate cutting to length of the plastics material, different diameters of the outer ring can be covered with the same plastics material. A slit of the film section which is curved to an annular shape can be adapted to the thermal elongation of the film section. Film sections pre-curved in this way may be applied to both side faces of the outer ring in order to produce an encapsulation of the anti-friction bearing.

According to the invention, the radially inwardly oriented limb of a film section, which is angled in cross-section, may be closed around its circumference, and a flat or angled film section can be deformed thermally or mechanically, for example by means of a deep-drawing process. In this case, film sections shaped in almost any desired manner, for example in the form of covering caps, can be produced without removal of material, their radially inwardly oriented annular rim overlapping the inner ring radially in an axially flush manner and optionally being at least lightly preloaded axially against the inner ring. Alternatively, the film section may extend radially around the inner ring and may be fitted into an annular recess formed in the internal circumference of the inner ring, so that a completely encapsulated anti-friction bearing is produced. In this case sealing material such as a sealing ring or fibrous web may be inserted between the film section and the recess.

In order to increase the volume of the lubricant, such as grease or oil, provided for lubricating the running surfaces between rolling bodies and inner and outer ring, an annular lubricant reservoir extended axially with respect to the bearing races and arranged radially in the region of the rolling diameter of the rolling bodies may be formed from the film section, for example by means of a deep-drawing process.

In this way film sections, produced for example from semi-finished product in the form of plastics films, can be pulled onto the external diameter of the outer ring under preload, without further fixing by adhesive or material joining. In this case it has proved advantageous if a retaining collar widened radially outwards is provided on the side face located opposite the side face having the radially inwardly extended film section. This retaining collar performs an auxiliary function when pulling the film section onto the external diameter during assembly, and is then removed without machining, for example by cutting.

BRIEF DESCRIPTION OF THE DRAWINGS

The anti-friction bearing configured according to the invention is explained in more detail below with reference to several preferred embodiments and to the appended drawings, in which.

DETAILED DESCRIPTION OF THE INVENTION

Figure 1:
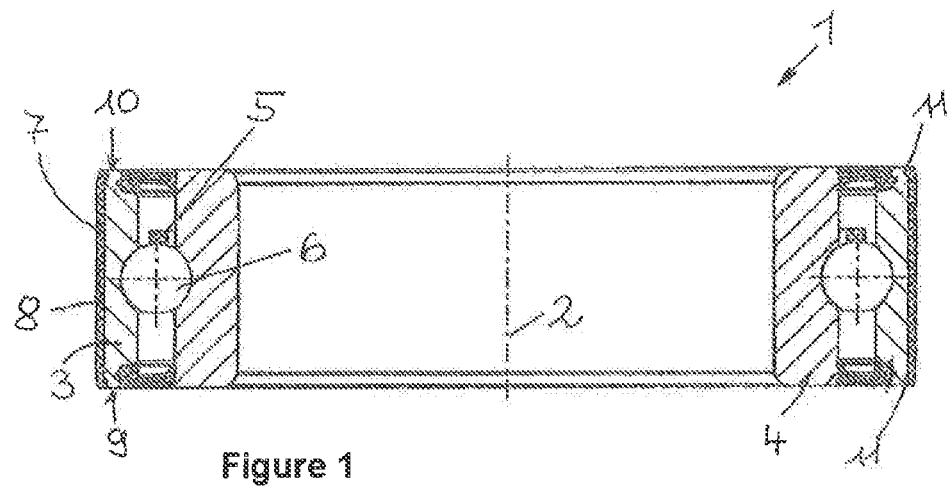
FIG. 1 shows a section through an anti-friction bearing with thermal insulation in the form of a film section made of plastics material.

FIG. 1 shows a section through the anti-friction bearing 1, which is configured to be rotationally symmetrical about the axis of rotation 2 and comprises the outer ring 3, the inner ring 4 and the rolling bodies 6, in the form of balls in this exemplary embodiment, positioned in the bearing cage 5. The exemplary embodiment illustrated shows a deep-grooved ball bearing. The invention likewise includes other anti-friction bearings, for example anti-friction bearings equipped with needles or ball rollers.

The film section 8 is applied to the external circumference 7 of the outer ring 3. The film section 8 is prefabricated as a strip from a plastics film and is, for example, bonded or sinter-fused to the external circumference. As a result of its low thermal conductivity and high electrical resistance, the film section 8 insulates the outer ring 3, and therefore the anti-friction bearing 1 and the bearing component mounted on the internal circumference thereof, with respect to the component to be supported on the outer circumference 7. The outer ring 3 has on both side faces 9, 10 chamfers 11 which allow the film section 8 to be spaced away from the component to be supported for improved insertion therein.

Figure 2:
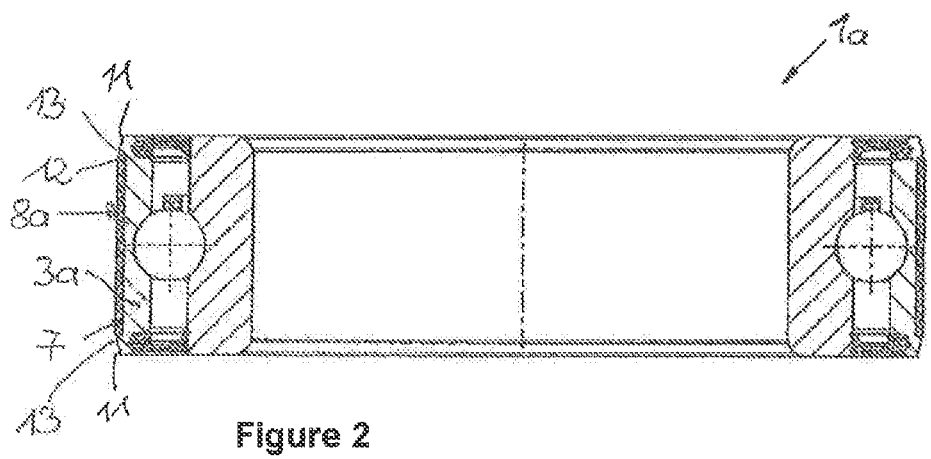
FIG. 2 shows a section through an anti-friction bearing which is slightly modified with respect to the anti-friction bearing of FIG. 1 and has a film section fitted into a recess.

FIG. 2 shows a section through the anti-friction bearing 1a which, in contrast to the anti-friction bearing 1 of FIG. 1, has a modified outer ring 3a. The annular recess 12, in which the film section 8a, which is shortened axially as compared to the film section 8 of FIG. 1, is fitted and thereby axially fixed, is formed on the external diameter 7 of the outer ring 3a. The radially raised lands 13 remaining between the recess 12 and the chamfers 11 can serve to center the outer ring 3a on the component to be supported and permit a negligible heat flow as compared to the full axial width of the outer ring 3a.

Figure 3:
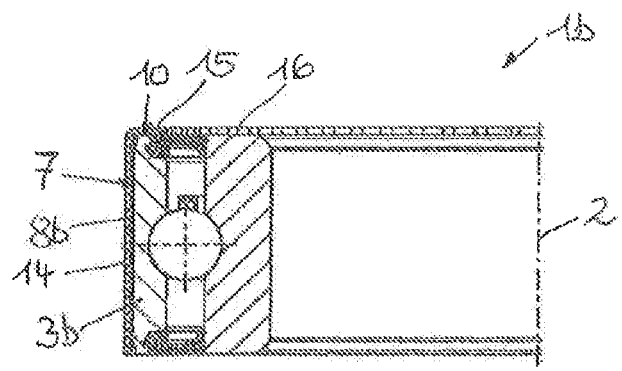
FIG. 3 shows a partial section through an anti-friction bearing which is slightly modified with respect to the anti-friction bearing of FIG. 1 and has a film section molded radially inwards around a side face of the outer ring.

FIG. 3 shows a partial section of the anti-friction bearing 1b, which is rotationally symmetrical about the axis of rotation 2. In contrast to the configuration of the film section 8 of the anti-friction bearing 1 of FIG. 1, the film section 8b is angled in cross-section with limbs 14, 15, the limb 14, configured in the form of an annular section, being arranged on the external circumference 7 of the outer ring 3b and being, for example, applied under pretension, bonded or sinter-fused, while the limb 15 on the side face 10 of the outer ring 3b is oriented radially inwards. In this case the film section 8b is preferably cut from prefabricated angled strip material and pre-curved to fit the external circumference 7 of the outer ring 3b. For this purpose notches 16 are provided in the limb 15.

Figure 4:
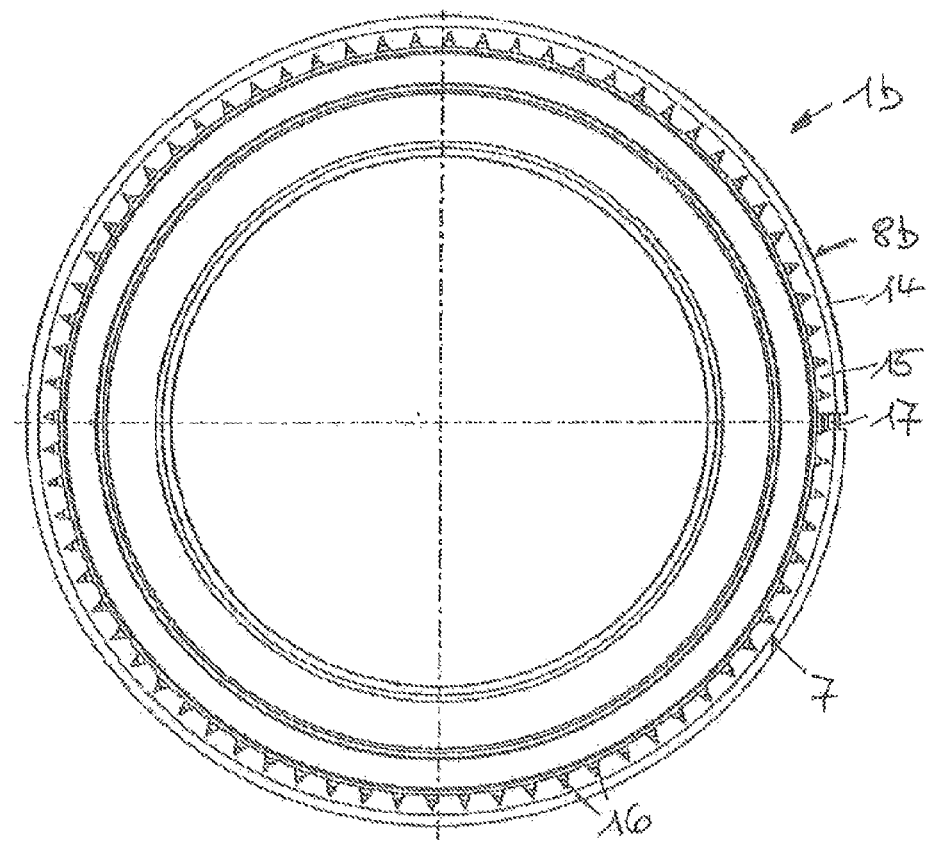
FIG. 4 is a plan view of the anti-friction hearing of FIG. 3.

FIG. 4 shows the anti-friction bearing 1b in a plan view, haying the angled film section 8b with the limbs 14, 15 applied to the outer ring 3b (FIG. 3). In order to simplify the application of the film section 8b, which is formed from straight strip material produced as a semi-finished product of plastics film and is pre-curved to fit the external circumference 7, notches 16 are provided in the annular limb 15. The length of the strip used to produce the film section 8b is calculated such that a slit 17, which allows for the different coefficients of expansion of the plastics material of the film section 8b and of the outer ring 3b (FIG. 3), is formed between the ends of the film section 8b.

Figures 5, 6:
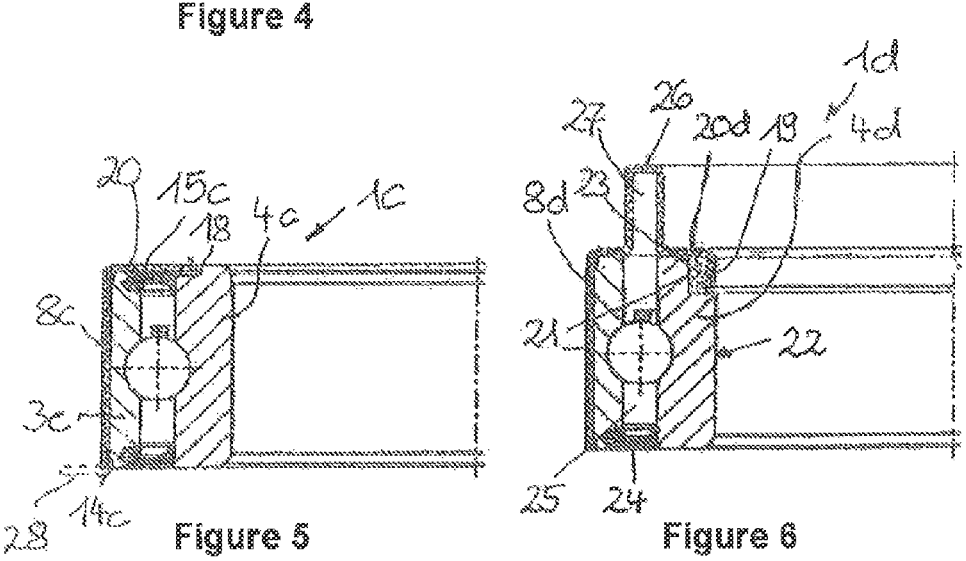
FIG. 5 shows a partial section through an anti-friction hearing which is slightly modified with respect to the anti-friction bearing of FIG. 3 and has an annular rim which is closed radially towards the inside.
FIG. 6 shows a partial section through an anti-friction bearing which is provided with a lubricant reservoir in contrast to the anti-friction bearing of FIG. 5.

FIG. 5 shows a partial section through the anti-friction hearing 1c, which also has a film section 8c angled in cross-section, the limb 14c being applied to the outer ring 3c and the limb 15c being extended radially inwards so far that it can be fitted into an annular recess 18 formed in the side face of the inner ring 4c without an additional axial space requirement, and may be at least slightly tensioned axially against said recess 18. The film section 8c is preferably produced from a deep-drawn plastics film, so that the film section 8c can be produced as a closed ring and the limb 15c as a continuous annular rim 20. In this case the pot base produced during the deep-drawing process is cut away and the pot wall forms the annular limb 15c of the film section. Alternatively, the circumferential limb 14c may be provided as the pot wall and the limb 15c may be formed by punching out the center of the pot base.

To enable the film section 8c to be pulled on to the outer ring 3c in a simple manner, a circumferential retaining collar 28 may be formed, or allowed to remain, during the deep-drawing process. After the film section 8c has been pulled on, the retaining collar is cut off. In a similar way, radially extended tabs distributed around the circumference of the film section 8c may be suitable for pulling same onto the outer ring 3c.

FIG. 6 shows in a partial section the anti-friction bearing 1d, which is a variant of the anti-friction bearing 1c of FIG. 5. In this case the preferably deep-drawn film section 8d is extended radially inwards to pass radially around the inner ring 4d. In this case the axial projection 19 of the radially inwardly extended annular rim 20d extends into the annular recess 21 formed in the internal circumference 22 of the inner ring 4d. The fibrous ring 23 forms a seal between the axial projection 19 and the internal circumference of the annular recess 21. The sealing of the axial projection 19 with respect to the inner ring 4d, in conjunction with the annular seal 24, forms a closed lubricant chamber 25 which is enlarged by the lubricant reservoir 27 as a result of the axial extension 26 of the film section 8d, so that the service life of the anti-friction bearing 1d is lengthened by the increased volume of lubricant.

LIST OF REFERENCES

1 Anti-friction Bearing
1a Anti-friction Bearing
1b Anti-friction Bearing
1c Anti-friction Bearing
1d Anti-friction Bearing
2 Axis of Rotation
3 Outer Ring
3a Outer Ring
3b Outer Ring
3c Outer Ring
4 Inner Ring
4c Inner Ring
4d Inner Ring
5 Bearing Cage
6 Rolling Body
7 External Circumference
8 Film Section
8a Film Section
8b Film Section
8c Film Section
8d Film Section
9 Side Face
10 Side Face
11 Chamfer
12 Recess
13 Land
14 Limb
14c Limb
15 Limb
15c Limb
16 Notch
17 Slit
18 Recess
19 Axial Projection
20 Annular Rim
20d Annular Rim
21 Recess
22 Internal Circumference
23 Fibrous Ring
24 Annular Seal
25 Lubricant Chamber
26 Axial Extension
27 Lubricant Reservoir
28 Retaining Collar

The invention claimed is:

1. An anti-friction bearing, comprising:
   an outer ring;
   an inner ring;
   roiling bodies, which are arranged between the outer ring and the inner ring, are distributed over a circumference of the outer ring and the inner ring and roll on the outer ring and the inner ring; and
   a thermal insulating layer comprising a film section, which is produced without removal of material from a plastics film, applied to an external circumference of the outer ring, over at least a part of an axial width of the outer ring and over at least a part of the external circumference of the outer ring, the film section having an axially extending limb applied to the external circumference of the outer ring and a radially extending limb extending to a side face of the inner ring.

2. The anti-friction bearing as recited in claim 1, wherein the film section is produced from a strip of the plastics film.

3. The anti-friction bearing as recited in claim 1, wherein the film section is connected to the external circumference adhesively.

4. The anti-friction bearing as recited in claim 1, wherein the radially extending limb has an axial extension that forms a circumferential lubricant reservoir radially on an inside of the film section.

5. The anti-friction bearing as recited in claim 1, further comprising a retaining collar on the film section that extends radially outwards, the retaining collar being provided on a side face of the outer ring located opposite another side face of the outer ring where the film section extends radially inwards.

6. The anti-friction bearing as recited in claim 1, wherein the shape of the film section is produced by a deep-drawing process.

7. The anti-friction bearing as recited in claim 1, wherein the film section is produced from a polyether ketone.

8. The anti-friction bearing as recited in claim 1, wherein the film section is reinforced.

9. The anti-friction bearing as recited in claim 1, wherein the inner ring has an annular recess in which a free end of the radially extending limb is received.

10. The anti-friction bearing as recited in claim 9, wherein the annular recess is formed on a side face of the inner ring.

11. The anti-friction bearing as recited in claim 9, wherein the annular recess is formed on an internal circumference of the inner ring.

12. The anti-friction bearing as recited in claim 1, wherein a free end of the radially extending limb is axially tensioned against the inner ring.

13. The anti-friction bearing as recited in claim 1, wherein the film section is connected to the external circumference by a material joint.

* * * * *